US008631435B2

(12) United States Patent
Kim

(10) Patent No.: US 8,631,435 B2
(45) Date of Patent: Jan. 14, 2014

(54) METHOD FOR PROVIDING PROGRAM IMAGE INFORMATION IN DIGITAL BROADCASTING RECEIVING DEVICE

(75) Inventor: Tae Hyung Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 688 days.

(21) Appl. No.: 11/874,556

(22) Filed: Oct. 18, 2007

(65) Prior Publication Data

US 2008/0098430 A1 Apr. 24, 2008

(30) Foreign Application Priority Data

Oct. 18, 2006 (KR) .............................. 2006-0101118

(51) Int. Cl.
*G06F 3/00* (2006.01)
*G06F 13/00* (2006.01)
*H04N 5/445* (2011.01)

(52) U.S. Cl.
USPC .......................... 725/44; 725/39; 348/E5.099

(58) Field of Classification Search
USPC ..................... 725/44, 43, 41, 39; 348/E5.099
See application file for complete search history.

(56) References Cited

U.S. PATENT DOCUMENTS

| 5,815,145 | A | * | 9/1998 | Matthews, III ................. 725/41 |
| 6,005,601 | A | * | 12/1999 | Ohkura et al. .................. 725/52 |
| 6,118,450 | A | * | 9/2000 | Proehl et al. ................... 715/810 |
| 6,526,577 | B1 | * | 2/2003 | Knudson et al. ................ 725/40 |
| 6,600,503 | B2 | * | 7/2003 | Stautner et al. ................ 715/854 |
| 7,386,806 | B2 | * | 6/2008 | Wroblewski .................. 715/788 |
| 2002/0056099 | A1 | * | 5/2002 | Takahashi et al. .............. 725/39 |
| 2005/0036068 | A1 | | 2/2005 | Shin |
| 2006/0150215 | A1 | | 7/2006 | Wroblewski |

FOREIGN PATENT DOCUMENTS

KR 100585534 5/2006

* cited by examiner

*Primary Examiner* — Brian Pendleton
*Assistant Examiner* — Alan Luong
(74) *Attorney, Agent, or Firm* — The Farrell Law Firm, P.C.

(57) ABSTRACT

A method for providing program image information in a digital broadcasting receiving device. The method includes receiving image broadcasting information segments containing pre-edited program image information about a plurality of channels to be displayed by displaying in a plurality of areas of a display screen and displaying the received image broadcasting information segments. The method allows display of program image information about a plurality of channels on a single screen, thus enabling a user to easily monitor a program being played back on each channel.

10 Claims, 10 Drawing Sheets

METHOD FOR PROVIDING PROGRAM IMAGE INFORMATION IN DIGITAL BROADCASTING RECEIVING DEVICE

PRIORITY

This application claims priority to an application filed in the Korean Intellectual Property Office on Oct. 18, 2006 and assigned Serial No. 2006-0101118, the contents of which are incorporated herein by reference.

BACKGROUND OF THE INVENTION

1. Field of the Invention

The present invention relates to a method for providing program image information in a digital broadcasting receiving device, and more particularly, to a method for displaying program image information about a plurality of channels on a single screen.

2. Description of the Related Art

Digital Multimedia Broadcasting (DMB) refers to a broadcasting service that provides a user with a digitally modulated multimedia (audio-video) signal. DMB enables the user to view diverse multimedia broadcasts through a personal portable or in-vehicle receiver having a non-directional receiving antenna, even while the user is in motion.

Technological advancements of memory capable of storing large amounts of digital multimedia data, such as motion video, music video, etc., and wide usage of mobile communication terminals, has been accompanied by development and commercialization of mobile communication terminals, such as DMB phones, capable of receiving digital broadcast data. DMB phones allow users to easily view digital broadcasts.

When a user desires to view information about channels other than currently selected ones or to move to another channel while viewing a digital broadcast, the user must view an entire screen of a program broadcast on each channel by scrolling through channels before selecting a desired channel and viewing a broadcasting program of the desired channel. Further, text-based information, such as channel name or broadcast time, is provided as program information together with digital broadcast data, thus making it difficult for the user to easily identify program information about the desired channel.

A method for providing image-based broadcast information has recently been developed to solve the above problems. According to the method, program information about a channel on which a program is being broadcast is displayed using image data preset for each program.

That is, program information about a channel is conventionally provided using image data preset for each program. Thus, the conventional method has a drawback that it cannot provide program information that dynamically changes over time. Thus, a user cannot obtain recent program image information about a program being broadcast on each channel.

SUMMARY OF THE INVENTION

In order to solve the above problems, the present invention may display program image information about a plurality of channels on a single screen.

The present invention may also display program image information about a plurality of channels using animated images.

According to an aspect of the present invention, there is provided a method for providing program image information in a digital broadcasting receiving device, including receiving image broadcasting information segments containing pre-edited program image information about a plurality of channels to be provided by displaying in a plurality of areas of a display screen; dividing the display screen into the plurality of areas using the received image broadcasting information segments and playing back program image information about a channel pre-allocated to each of the areas; selecting one of the areas in response to an area select signal; and enlarging the selected area.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
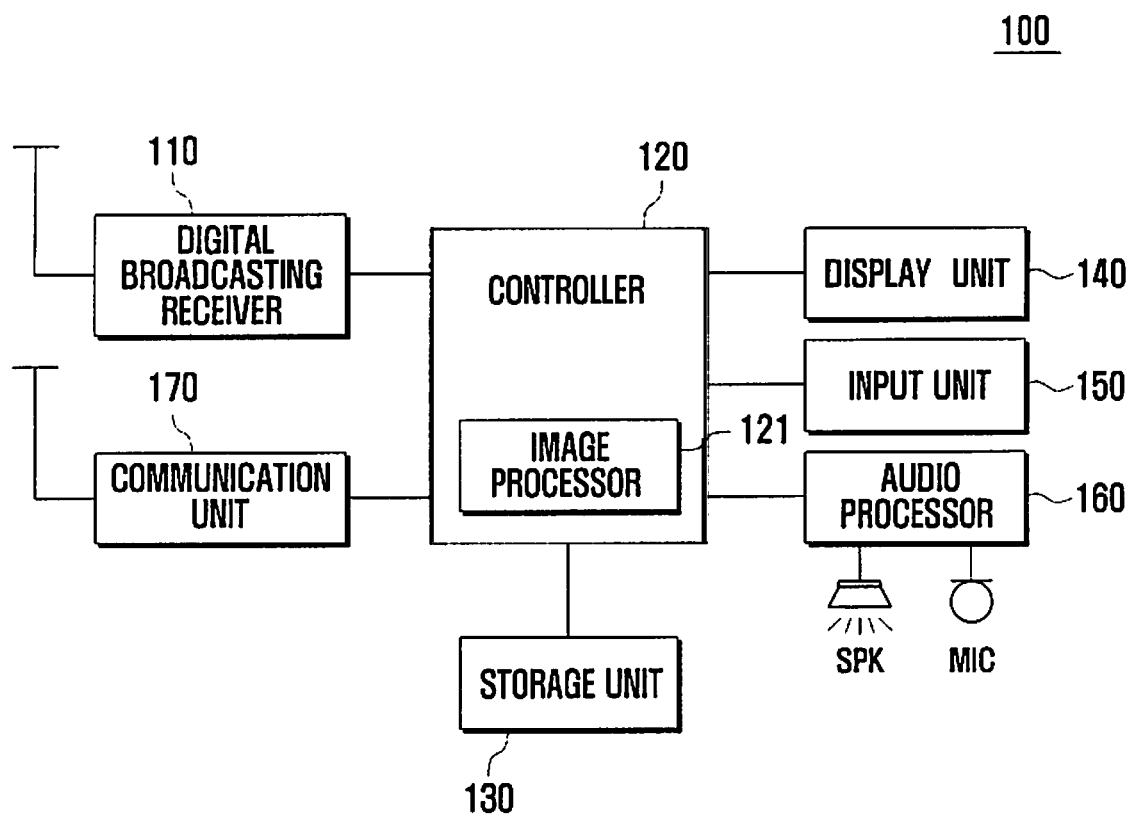
FIG. 1 illustrates a configuration of a digital broadcasting receiving device to which the present invention applies.

Hereinafter, preferred embodiments of the present invention are described in detail with reference to the accompanying drawings. The same reference numbers are used throughout the drawings to refer to the same or like parts. Detailed description of constructions or processes well-known in the art or not directly related to the present invention may be omitted to avoid obscuring the subject matter of the present invention.

Particular terms used in the specification and claims are defined as follows.

An image broadcasting information channel according to the present invention refers to a channel for providing image broadcasting information in a plurality of areas of a display screen. More specifically, an image broadcasting information channel is designed for receiving real-time pre-edited programs that are being broadcast on a plurality of channels to be displayed on one screen, and for displaying the same on a display unit.

Program image information refers to motion video data of a program for each broadcast time zone of a channel, wherein the program image information is pre-edited by a broadcasting service provider. The program image information contains only video information.

Image broadcasting information segments mean pre-edited program information about a plurality of channels displayed in a plurality of areas of a display screen. The display screen is divided into a plurality of areas. For example, the display screen is divided into 4, 6, 8, 9, 12, or 15 areas. In particular, each image broadcasting information segment includes pre-edited program image information about each channel and program guide data mapped thereto.

A playlist refers to a list of programs being currently broadcast on a plurality of channels.

Program guide data means text information about a program including start and end times and synopsis.

A digital broadcasting standard used in the present invention may be Digital Multimedia Broadcasting (DMB), Digital Video Broadcasting-Handheld (DVB-H), Media Forward Link Only (Media FLO) or other standard.

Preferably, a digital broadcasting receiving device used in the present invention is a mobile communication terminal that can support a digital broadcast receiving function.

Prior to describing a method for providing program image information in a digital broadcasting receiving device, a configuration of a digital broadcasting receiving device 100 to which the present invention applies is described with reference to FIG. 1.

The digital broadcasting receiving device 100 includes a digital broadcasting receiver 110, a controller 120, a storage unit 130, a display unit 140, an input unit 150, and an audio processor 160, and a communication unit 170.

The digital broadcasting receiver 110 receives a transmitted broadcast signal and separates the broadcast signal into audio and video signals. In particular, the digital broadcasting receiver 110 receives image broadcasting information segments containing pre-edited program image information about a plurality of channels to be provided by displaying in a plurality of areas of a display screen. If a channel change signal is input, the digital broadcasting receiver 110 is controlled by the controller 120 to receive a broadcast signal corresponding to a changed channel.

The storage unit 130 stores operation and state information of the digital broadcasting receiving device 100 and programs and data necessary to support the controller operation. The storage unit 130 may be Erasable Programmable Read Only Memory (EPROM), Static Random Access Memory (SRAM), flash memory, or various other types of memory. In particular, the storage unit 130 stores image broadcasting information segments received from the digital broadcasting receiver 110.

The controller 120 controls the overall state and operation of the digital broadcasting receiving device 100. The controller 120 may be a microprocessor or a Digital Signal Processor (DSP). The controller 120 also outputs the audio signal of the broadcast signal to the audio processor 160 and decodes the video signal into a Moving Picture Experts Group (MPEG) signal to output the MPEG signal to an image processor 121. In particular, the controller 120 controls the display unit 140 to play back the image broadcasting information segments received from the digital broadcasting receiver 110. In the configuration of FIG. 1, the controller 120 includes the image processor 121 that processes the received image broadcasting information segments.

The image processor 131 divides a display screen into a plurality of areas using the image broadcasting information segments received from the digital broadcasting receiver 110. The image processor 121 then places program image information about a channel pre-allocated to each of the areas into the corresponding area to organize the entire display screen. The controller 120 controls the display unit 140 to play back the program image information in the plurality of areas in the display screen.

The controller 120 selects one of the areas in response to an area select signal input by a user. Preferably, the area select signal is input through arrow keys (left, right, up, down). The controller 120 moves through the plurality of areas for selection in accordance with the area select signal.

The controller 120 controls the image processor 121 to enlarge the selected area. The controller 120 controls the display unit 140 to play back program image information about channels allocated to the selected and non-selected areas on a single screen. When a playback signal is input to the selected area, the controller 120 then controls play back of a channel pre-allocated to the selected area.

More specifically, the controller 120 controls the digital broadcasting receiver 110 to receive a broadcast signal of a channel and the display unit 140 to play back the broadcast signal. The display unit 140 displays the broadcast signal received under the control of the controller 120 on the entire screen.

If an advertising channel is allocated to the selected area, the controller 120 orders a product being advertised on the selected area in response to a product ordering signal input to the selected area. More specifically, the controller 120 creates an order message relevant to the product being advertised on the selected area. The controller 120 then sends the order message to an advertising channel provider through the communication unit 170. The controller 120 also controls the communication unit 170 to transmit the order message to a vendor of the product being advertised. The order message specifies product name, buyer's phone number, and the quantity of products being purchased. Thereafter, the controller 120 controls the communication unit 170 to receive an order completion message from the advertising channel provider or vendor.

If an advertising channel is not pre-allocated to the selected area, the controller 120 controls the display unit 140 to display menu items in response to an input menu select signal, and the controller 120 performs a function corresponding to a menu item that is selected from the displayed menu items based on user selection information. The displayed menu items include Playlist and Program Guide Data items.

If the Playlist menu item is selected, the controller 120 controls the image processor 121 to extract program image information about each channel with the corresponding program guide data for each channel from the corresponding image broadcasting information segment received from the digital broadcasting receiver 110.

The controller 120 combines the extracted program image information about each of the plurality of channels with the corresponding program guide data to form a plurality of information pairs. The controller 120 then controls the display unit 140 to sequentially display the plurality of information pairs of the program image information and the corresponding program guide data in the plurality of areas of the display screen pre-allocated for the corresponding channels. One of the areas may be selected through input of the area select signal to enlarge the selected area, and the corresponding broadcast signal may be played back on the display unit 140 through input of to the play back signal, as described previously.

If the Program Guide Data menu item is selected, the controller 120 controls the display unit 140 to simultaneously display the enlarged area and program guide data corresponding thereto.

The display unit 140 displays the state and operation information of the digital broadcasting receiving device 100. The display unit 140 is also controlled by the controller 120 to receive and display data corresponding to user input through the input unit 150, and to display the operation state of the digital broadcasting receiving device 100 and various types of information using icons and characters. Further, the display unit 140 is controlled by the controller 120 to visually notify a user that a necessary function has been set.

In particular, the display unit 140 displays the received image broadcasting information segments under the control of the controller 120. The display unit 140 also distinguishes the selected area from non-selected areas to display them on one screen. The display unit 140 displays the selected area enlarged by the image processor 121.

When a playback signal is input to the selected area, the controller 120 controls play back of a channel pre-allocated to the selected area, receives a broadcast signal of the channel from the digital broadcasting receiver 110 and controls the display unit 140 to play back the broadcast signal over the entire screen.

The input unit 150 acts as a user interface and may be a keypad, touch screen, or other type of input device. The input unit 150 outputs a signal input by the user to the controller 120. That is, the input unit 150 outputs a control signal according to user selection information, for the controller 120 to perform an operation in response thereto. In particular, the input unit 150 receives an area select signal for moving to a selected area according to the user selection information. The input unit 150 also inputs a playback signal to the controller 120 for playing back the selected area according to the user selection information.

The audio processor 160 processes a user's voice signal input through a microphone MIC into a form suitable for transmission through a wireless unit. The audio processor 160 also processes a voice signal received from another party through the wireless unit or various audio signals generated by the controller 120 into a signal for output through a speaker SPK. In particular, the audio processor 160 outputs an audio signal of a broadcast signal received from the digital broadcasting receiver 110 through the speaker SPK.

The communication unit 170 is connected to the controller 120 and converts voice data and control data into a Radio Frequency (RF) signal for transmission. The communication unit 170 also receives an RF signal and converts the signal into voice data and control data for output to the controller 120. In particular, the communication unit 170 is controlled by the controller 120 to send an order message created by user selection information to at least one of a vendor and advertising channel provider. The communication unit 170 is also controlled by the controller 120 to receive an order completion message from an advertising channel provider or vendor.

Figure 2:
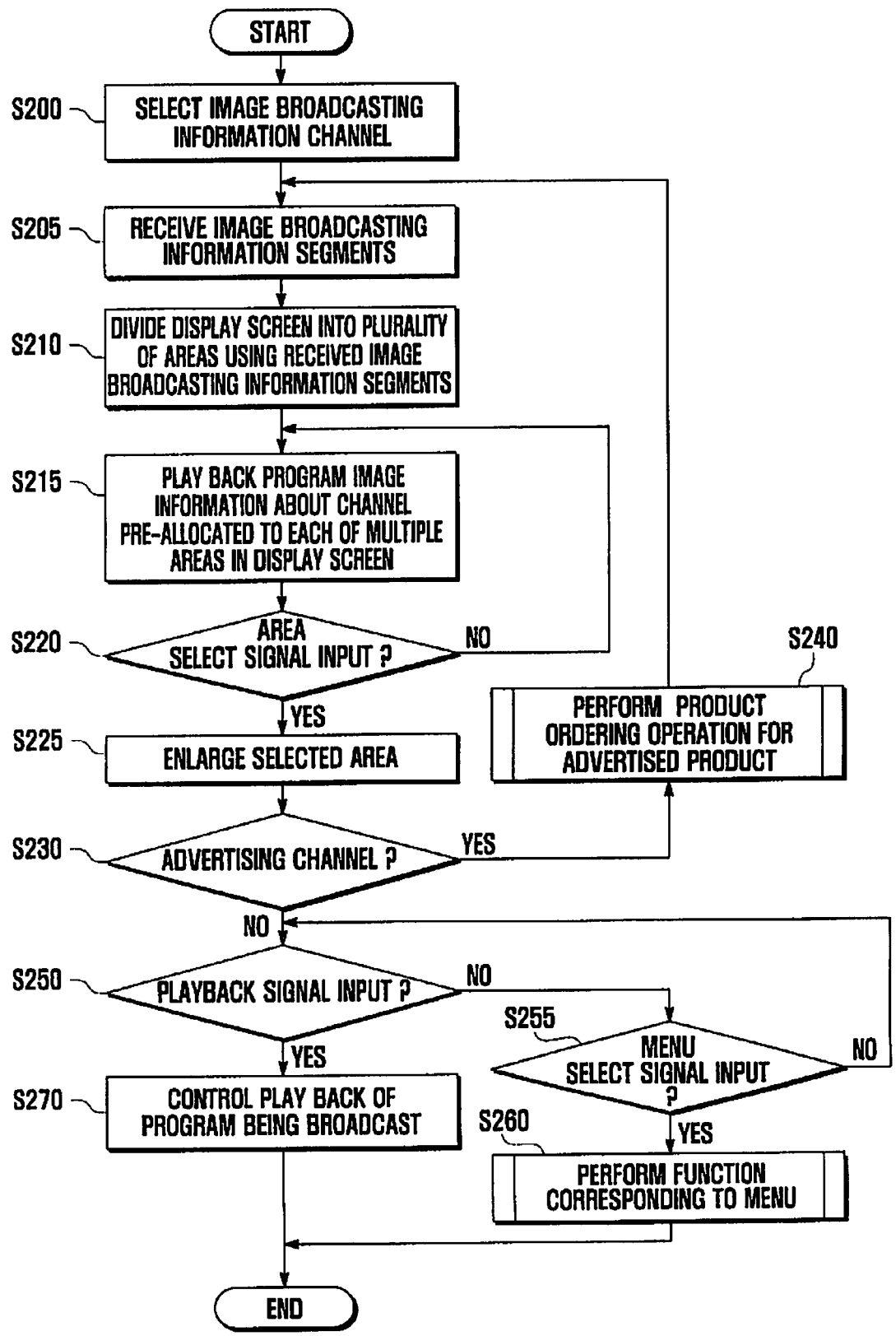
FIG. 2 is a flowchart illustrating a method for providing program image information in a digital broadcasting receiving device according to the present invention.

FIG. 2 shows a method for providing program image information in a digital broadcasting receiving device according to the present invention.

Figure 6A:
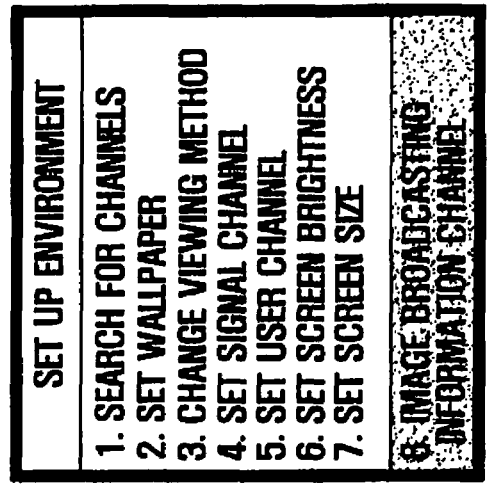
FIGS. 6A-6C illustrate an example of a screen showing a process of displaying image broadcasting information according to the method of FIG. 2.

Referring to FIGS. 1 and 2, the controller 120 selects an image broadcasting information channel in response to user selection information in step S200. For example, referring to FIG. 6A, an image broadcasting information channel for displaying broadcasting information as an image is selected. Upon selection, the controller 120 controls the digital broadcasting receiver 110 to receive image broadcasting information segments in step S205.

The controller 120 then controls the image processor 121 to divide a display screen into a plurality areas using the received image broadcasting information segments in step S210. The controller 120 controls the image processor 121 to organize the screen by placing program image information about a channel pre-allocated to each of the areas of the display screen into the area, and controls the display unit 140 to play back the organized screen in step S215. Thus, the method for providing program image information in a digital broadcasting receiving device according to the present invention allows display of program image information about a plurality of channels on a single screen, thus enabling the user to easily view a program being played back on each channel. The method also allows display of image information instead of text information, thus stimulating user interest.

During display of program image information according to step S215, the controller 120 checks whether an area select signal is input in step S220. If an area select signal is input, the controller 120 selects one of the plurality of areas and controls the image processor 121 to enlarge the selected area in step S225. The area select signal is input through arrow keys (left, right, up, down). The controller 120 moves through the plurality of areas for selection in accordance with the area select signal.

Figure 6B:
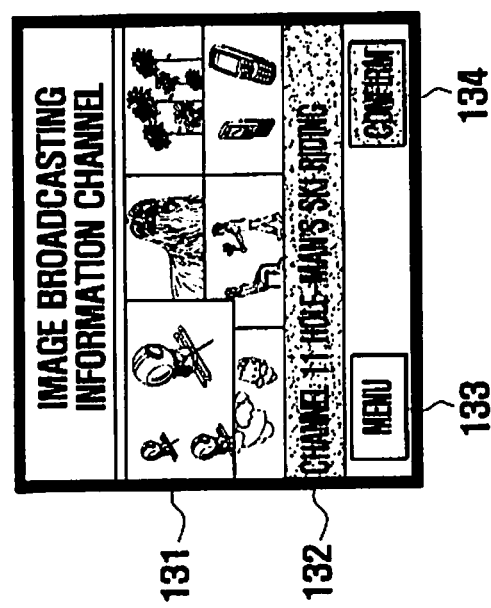
Figure 6C:
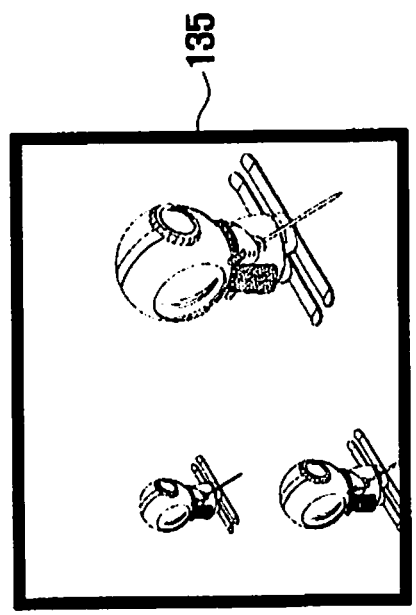

For example, referring to FIG. 6B, a selected area 131 is enlarged. Information 132 about a channel allocated to the selected area 131, such as "CH11 HOLE-MAN'S SKI RIDING", may be displayed at a lower part of the screen.

The controller 120 checks whether an advertising channel is allocated to the enlarged selected area in step S230. If an advertising channel is allocated to the selected area, the controller 120 performs a product ordering operation and, according user input, controls the communication unit 170 to order a product being advertised on the channel in step S240. Step S240 is illustrated in detail in FIG. 3 as follows.

Figure 3:
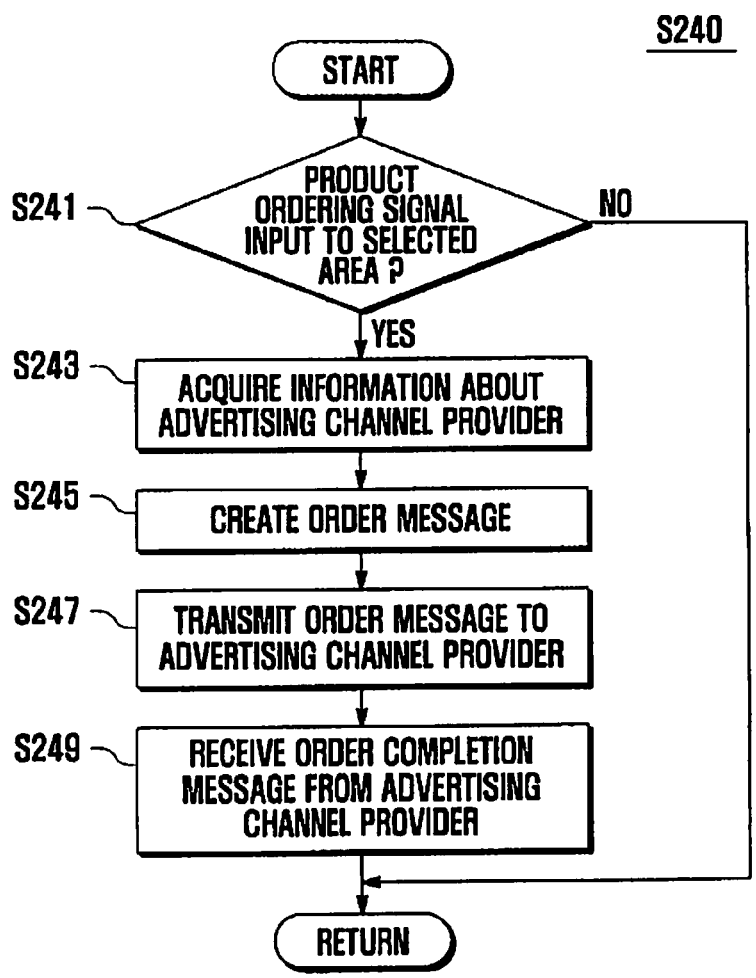
FIG. 3 is a detailed flowchart illustrating an operation of ordering a product appearing on an advertising channel according to the method of FIG. 2.

Referring to FIGS. 1 and 3, the controller 120 checks whether a product ordering signal is input to the selected area in step S241. If a product ordering signal is input, the controller 120 acquires information about an advertising channel provider and the product being advertised in step S243. The controller 120 creates an order message using the acquired information, and sends the order message to the advertising channel provider through the communication unit 170 in step S247. The controller 120 may also transmit the order message to a vendor through the communication unit 170. Preferably, the order message specifies product name, buyer's phone number, and the quantity of products being purchased. The controller 120 then receives an order confirmation message from the advertising channel provider in step S249.

Figure 7A:
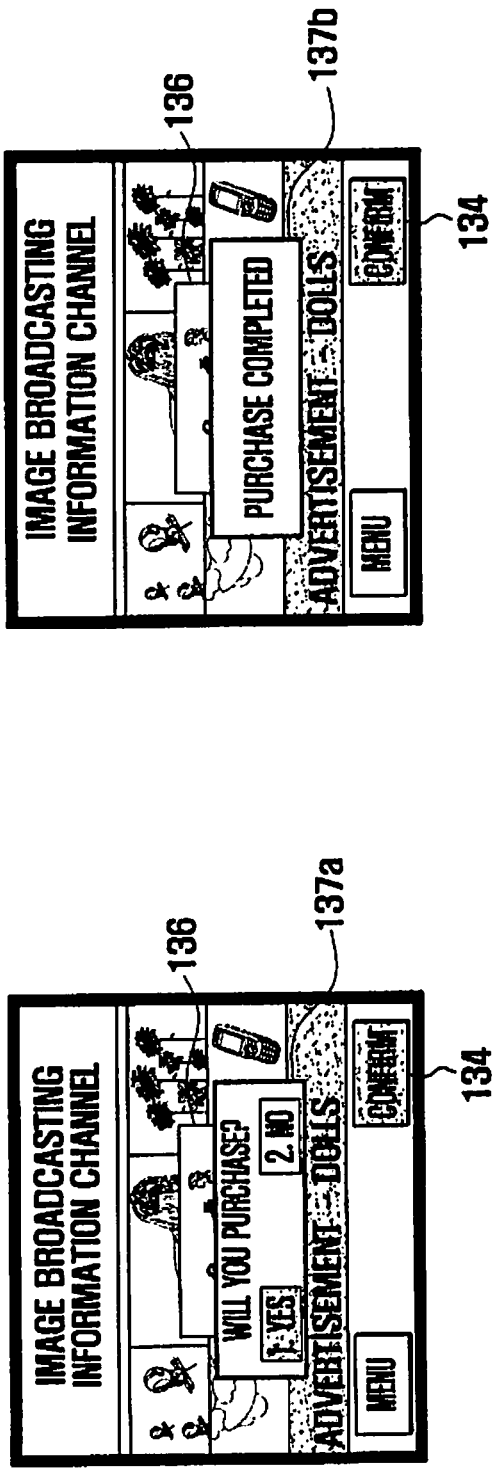
FIGS. 7A and 7B illustrate an example of a screen showing the process of ordering a product corresponding to an advertisement image according to the operation of FIG. 3.
Figure 7B:
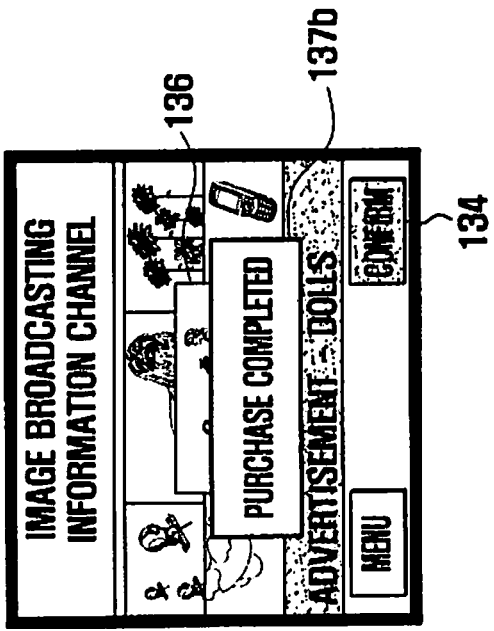

FIGS. 7A and 7B show an example of a screen showing the process of ordering a product corresponding to an advertisement image. If an advertising channel is pre-allocated to a selected area as shown in FIG. 7A, in response to an input of a confirm key 134, a pop-up window 137a asking the user whether to order a product is displayed.

If '1. YES' is selected according to user selection information in the screen of FIG. 7A, a pop-up window 137b indicating order completion is displayed as illustrated in FIG. 7B.

Returning to FIG. 2, if an advertising channel is not allocated to the selected area at step S230, the controller 120 checks whether a playback signal is input in step S250. If a playback signal is not input, the controller 120 checks whether a menu select signal is input in step S255.

If a menu select signal is input, the controller 120 performs a function corresponding to a menu item that is selected from menu items displayed in response to the input menu select signal in step S260. Step S260 is shown in detail in FIG. 4 as follows.

Figure 4:
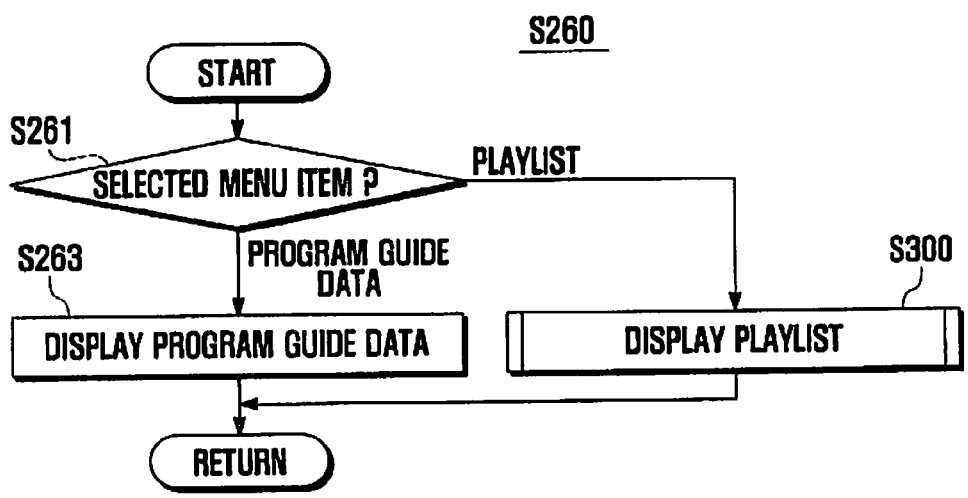
FIG. 4 is a detailed flowchart illustrating an operation of performing a function corresponding to a menu item according to the method of FIG. 2.

Referring to FIGS. 1 and 4, the controller 120 identifies the selected menu item in step S261. If the Program Guide Data menu item is selected, the controller 120 controls the display unit 140 to simultaneously display the selected area together with program guide data in step S263.

Figure 8A:
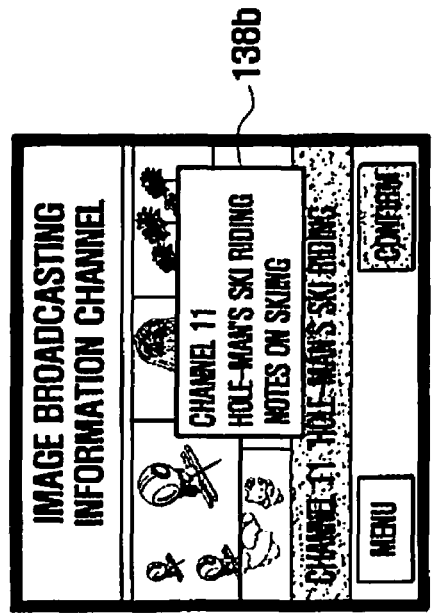
FIGS. 8A and 8B illustrate an example of a screen showing a step of displaying program guide information according to the operation of FIG. 4.
Figure 8B:
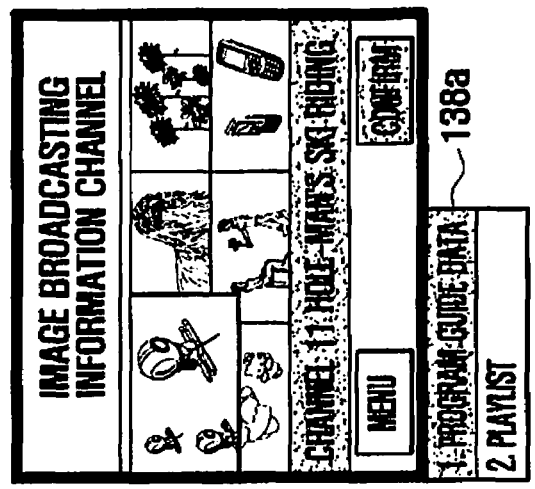

FIGS. 8A and 8B show an example of a screen showing step S263. If a '1. Program Guide Data' menu item 138a is selected as illustrated in FIG. 8A, image information about the program displayed in the selected area and program guide data 138b corresponding thereto are displayed simultaneously as shown in FIG. 8B.

If the Playlist menu item is selected at the step S261, the controller 120 controls the display unit 140 to display the playlist in step S300. Step S300 is shown in detail in FIG. 5 as follows.

Figure 5:
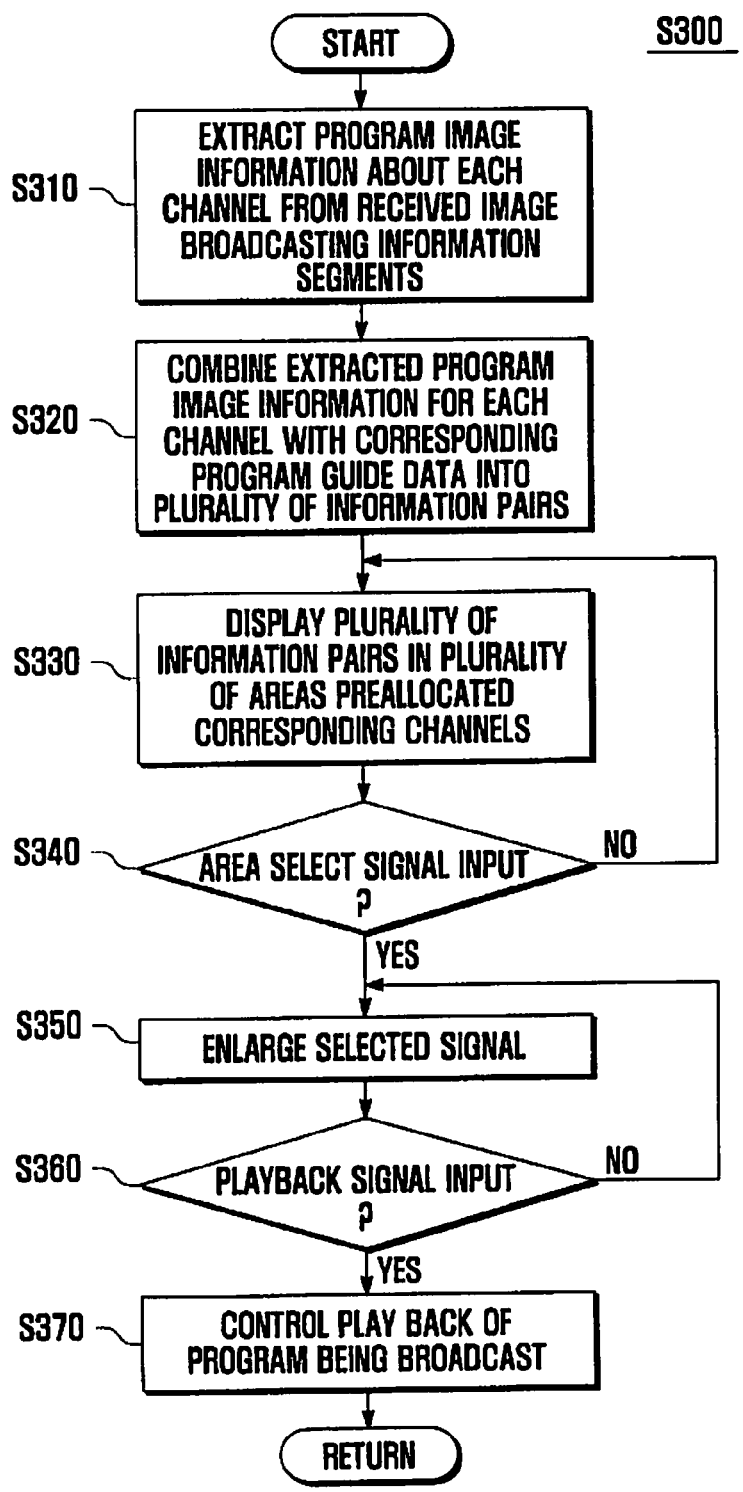
FIG. 5 is a detailed flowchart illustrating the step of displaying a playlist according to the operation of FIG. 4.

Referring to FIGS. 1 and 5, the controller 120 controls the image processor 121 to extract program image information about each channel and program guide data corresponding thereto from an image broadcasting information segment received from the digital broadcasting receiver 110 in step S310. The controller 120 combines the extracted program image information about each of the plurality of channels with the corresponding program guide data for each channel to form a plurality of information pairs in step S320.

The controller 120 then controls the display unit 140 to sequentially display the plurality of information pairs of the program image information and the corresponding program guide data in the plurality of areas of the display screen pre-allocated for the corresponding channels in step S330.

Figure 9A:
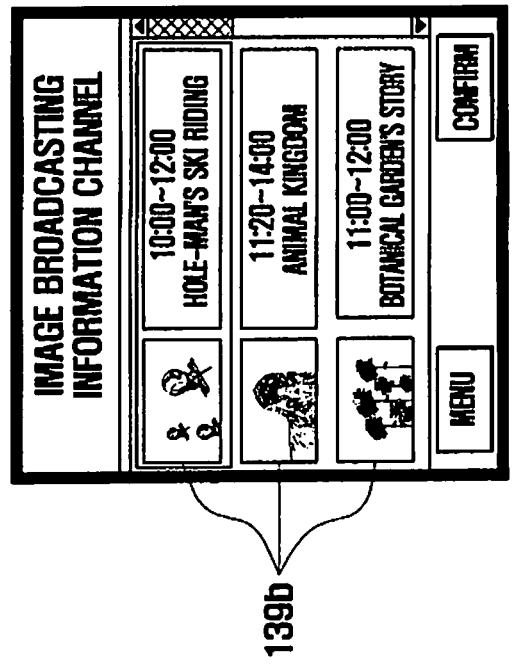
FIGS. 9A and 9B illustrate an example of a screen showing the step of displaying a playlist of FIG. 5.
Figure 9B:
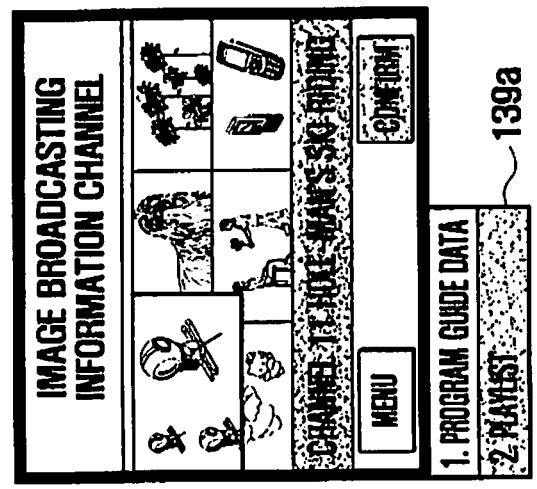

Next, the controller 120 checks whether an area select signal is input in step S340. If an area select signal is input, the controller 120 enlarges the selected area and controls the display unit 140 to display the enlarged selected area in step S350. The selected area and non-selected areas may be displayed simultaneously on a single screen. FIGS. 9A and 9B show an example of a screen showing step S300. If a playlist is selected from menu items shown in FIG. 9A, pairs 139b of program image information and the corresponding program guide data of each channel are displayed as shown in FIG. 9B.

If an area select signal is not input at step S340, the process returns to step S330.

Subsequently, the controller 120 checks whether a playback signal is input in step S360. If a playback signal is input, the controller 120 controls play back of the channel pre-allocated to the selected area, receives a broadcast signal of the channel from the digital broadcasting receiver 110, and controls the display unit 140 to play back the broadcast signal in step S370.

Returning to FIG. 2, if a playback signal is input in at step S250, the controller 120 controls play back of the channel pre-allocated to the selected area, and controls the digital broadcasting receiver 110 to receive a broadcast signal of the channel and output the broadcast signal through the display unit 140 and the audio processor 160 in step S270. The controller 120 controls the display unit 140 to display the broadcast signal of the channel over the entire screen.

Although specific terms are employed herein, they are used in a generic and descriptive sense only and not for purposes of limitation. While the present invention has been particularly shown and described with reference to embodiments thereof, it will be understood by those of ordinary skill in the art that various changes in form and details may be made therein without departing from the spirit and scope of the present invention as defined by the following claims.

The present invention enables display of program image information about a plurality of channels on a single screen, thus enabling the user to easily view a program being played back on each channel. The present invention also allows display of image information instead of text information, thus stimulating user interest.

What is claimed is:

1. A method for providing program image information in a digital broadcasting receiving device, the method comprising:

receiving image broadcasting information segments about a plurality of channels, each image broadcasting information segment containing motion video data of a program pre-edited for each broadcast time zone of a channel and program guide data mapped thereto;

dividing the display screen into the plurality of areas using the received image broadcasting information segments and playing back each motion video data contained in the image broadcast information segments about a plurality of channels in each divided area, each channel being pre-allocated to each divided area;

selecting one of the areas in response to an area select signal;

enlarging the selected area;

displaying menu items comprising a playlist menu item and a program guide data menu item together with the enlarged selected area when a menu display signal is input to the enlarged selected area;

extracting program image information about each channel from the received image broadcasting information segment when the playlist menu item is selected;

combining the extracted program image information about each of the plurality of channels with the corresponding program guide data for each channel to form a plurality of information pairs; and sequentially displaying the plurality of information pairs comprising both the program image information and the corresponding program guide data in the plurality of areas of the display screen pre-allocated for the corresponding channels.

2. The method of claim 1, wherein in enlarging the selected area, program image information about channels allocated to the selected area and to the non-selected areas are displayed on a single screen.

3. The method of claim 1, further comprising controlling play back of the channel allocated to the enlarged selected area, receiving a broadcast signal of the channel, and outputting the broadcast signal when a playback signal is input to the enlarged selected area.

4. The method of claim 3, wherein in outputting the broadcast signal, the received broadcast signal is displayed on the entire screen.

5. The method of claim 1, wherein in selecting one of the areas, the area is selected in response to a signal input through left/right/up/down arrow keys.

6. The method of claim 1, further comprising controlling play back of the channel allocated to the enlarged selected area, receiving a broadcast signal of the channel, and outputting the broadcast signal when a playback signal is input to the enlarged selected area.

7. The method of claim 1, wherein performing a function corresponding to the selected menu item comprises simultaneously displaying program guide data corresponding to the selected area together with the enlarged selected area when the program guide data menu item is selected.

8. The method of claim 1, further comprising ordering a product advertised on the enlarged selected area in response to a product ordering signal input to the enlarged selected area when an advertising channel is pre-allocated to the selected area.

9. The method of claim 8, wherein ordering an advertised product comprises:
  creating an order message relevant to the product being advertised; and
  transmitting the order message to a provider of the advertising channel.

10. The method of claim 9, wherein the order message specifies product name, buyer's phone number, and a quantity of products being purchased.

* * * * *